US011866307B2

(12) United States Patent
Brames

(10) Patent No.: US 11,866,307 B2
(45) Date of Patent: Jan. 9, 2024

(54) CONFIGURATION OF A STRUCTURAL SUPPORT FOR A BOOM OF A PIPELAYER MACHINE

(71) Applicant: Caterpillar Inc., Peoria, IL (US)

(72) Inventor: Aaron M. Brames, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 2 days.

(21) Appl. No.: 17/660,795

(22) Filed: Apr. 26, 2022

(65) Prior Publication Data

US 2023/0339730 A1 Oct. 26, 2023

(51) Int. Cl.
*B66C 23/44* (2006.01)
*B66C 23/64* (2006.01)

(52) U.S. Cl.
CPC .............. *B66C 23/44* (2013.01); *B66C 23/64* (2013.01)

(58) Field of Classification Search
CPC ......... B66C 23/44; B66C 23/64; B66C 23/66; B66C 23/70
See application file for complete search history.

(56) References Cited

U.S. PATENT DOCUMENTS

| | | | | |
|---|---|---|---|---|
| 1,941,952 | A * | 1/1934 | Nickles | B66C 23/70 52/638 |
| 2,991,890 | A * | 7/1961 | Kennedy | B66C 23/36 212/258 |
| 4,253,579 | A * | 3/1981 | Williams | E02F 3/48 52/650.2 |
| 4,863,044 | A * | 9/1989 | Trask | B66C 23/36 212/347 |
| 11,053,104 | B2 | 7/2021 | Dunn et al. | |
| 2002/0053551 | A1* | 5/2002 | Koster | B66C 23/74 212/177 |
| 2007/0221600 | A1* | 9/2007 | Davis | B66C 23/44 212/270 |
| 2009/0297275 | A1* | 12/2009 | Davis | F16L 1/028 212/258 |
| 2011/0284490 | A1* | 11/2011 | Liu | B66C 23/70 212/347 |
| 2012/0080397 | A1* | 4/2012 | Willim | B66C 23/70 212/177 |

(Continued)

FOREIGN PATENT DOCUMENTS

| | | | |
|---|---|---|---|
| DE | 69823973 | T2 | 5/2005 |
| WO | 2008141095 | A1 | 11/2008 |
| WO | 2015137908 | A1 | 9/2015 |

OTHER PUBLICATIONS

New sideboom conversion attachment hitting market. Pipeline & Gas Journal. Jan. 2007. Oildom Publishing Company of Texas, Inc. 2 pages.

*Primary Examiner* — Michael R Mansen
*Assistant Examiner* — Juan J Campos, Jr.
(74) *Attorney, Agent, or Firm* — Harrity & Harrity, LLP

(57) ABSTRACT

A boom, of a machine, may include a first member; a second member opposite the first member; and a support structure. The support structure may comprise a first support member; a second support member; and a third support member. The first member, the first support member, and the second support member may define a first opening. The second member, the second support member, and the third support member may define a second opening. A first area of the first opening may exceed a second area of the second opening.

20 Claims, 3 Drawing Sheets

(56) References Cited

U.S. PATENT DOCUMENTS

| | | | | |
|---|---|---|---|---|
| 2012/0110946 A1* | 5/2012 | Daas | B66C 23/70 | 52/646 |
| 2012/0205336 A1* | 8/2012 | Han | B66C 23/70 | 212/347 |
| 2016/0016765 A1* | 1/2016 | Bohnacker | B66C 23/70 | 52/650.1 |
| 2016/0264384 A1* | 9/2016 | Roodenburg | B66C 23/365 | |
| 2017/0275143 A1* | 9/2017 | Orlean | B66C 23/70 | |

* cited by examiner

CONFIGURATION OF A STRUCTURAL SUPPORT FOR A BOOM OF A PIPELAYER MACHINE

TECHNICAL FIELD

The present disclosure relates generally to a pipelayer machine and, for example, to a configuration of a structural support for a boom of a pipelayer machine.

BACKGROUND

A pipelayer machine is used for installing large, heavy pipeline segments below and/or above ground. A boom, of the pipelayer machine, may include a support structure provided at a bottom portion of the boom. The support structure may include crossmembers that are configured in an "X" shape. By such a design, the location and the configuration of the support structure reduce a field of view of an operator to areas surrounding the pipelayer machine. For example, one or more of the crossmembers may obstruct a view of the operator to the areas surrounding the pipelayer machine.

Performing a lifting operation under a reduced field of view may cause the operator to frequently stop the pipelayer machine to ensure that obstructions are not present in the areas surrounding the pipelayer machine. Accordingly, the reduced field of view may decrease a measure of efficiency of operating the pipelayer machine.

The structural support, of the boom of the pipelayer machine, of the present disclosure solves one or more of the problems set forth above and/or other problems in the art.

SUMMARY

In some implementations, a boom of a pipelayer machine includes a first member; a second member opposite the first member; and a support structure, connected to the first member and the second member, comprising: a first support member, a second support member, and a third support member, a first end of the first support member being connected to the first member and a second end of the first support member being connected to the second member, a third end of the second support member being connected to the first member and a fourth end of the second support member being connected to the second end of the first support member, the fourth end being connected to the second member, a fifth end of the third support member being connected to the second support member and a sixth end of the third support member being connected to a portion, of the second member, different than respective portions, of the second member, connected to the second end and the fourth end.

In some implementations, a pipelayer machine includes a machine chassis; an operator cabin supported by the machine chassis; and a boom coupled to the machine chassis, the boom comprising a first member, a second member opposite the first member, and a support structure, the support structure being provided adjacent to the operator cabin, the support structure comprising a first support member, a second support member, and a third support member, a first end of the first support member being connected to the first member and a second end of the first support member being connected to the second member, a third end of the second support member being connected to the first member and a fourth end of the second support member being connected to the second end of the first support member, and a fifth end of the third support member being connected to the second support member and a sixth end of the third support member being connected to a portion, of the second member, different than the second end and the fourth end.

In some implementations, a boom of a machine includes a first member; a second member opposite the first member; and a support structure comprising: a first support member, a second support member, and a third support member, a first end of the first support member being connected to the first member and a second end of the first support member being connected to the second member, a third end of the second support member being connected to the first member and a fourth end of the second support member being connected to the second end of the first support member, a fifth end of the third support member being connected to the second support member and a sixth end of the third support member being connected to a portion, of the second member, different than the second end and the fourth end, and the support structure being configured to be provided adjacent to an operator cabin of the machine.

DETAILED DESCRIPTION

The present disclosure is directed to increasing a field of view of an operator of a pipelayer machine to areas around the pipelayer machine by configuring a support structure of a boom of the pipelayer machine. For example, the present disclosure is directed to configuring locations of support members of the support structure. As a result of configuring the locations of the support members, a size of a viewing opening formed by the support members (e.g., formed by two support members) may be increased. In this regard, the support members may be configured in a shape different than the "X" shape of support structures of existing pipelayer machines. By configuring the support member in this manner, a size of a viewing opening formed by the support member may exceed a size of a viewing opening formed by a support structure of an existing pipelayer machine.

Accordingly, by configuring the support structure to increase the size of the viewing opening in this manner, a field of view of the operator to the areas surrounding the pipelayer machine may be increased in comparison to fields of view of operators to similar areas surrounding existing pipelayer machines. Increasing the field of view of the operator may increase a measure of efficiency of operating the pipelayer machine during lifting operations.

The term "machine" may refer to a device that performs an operation associated with an industry such as, for example, mining, construction, farming, transportation, or another type of industry. Moreover, one or more implements may be connected to the machine.

Figure 1:
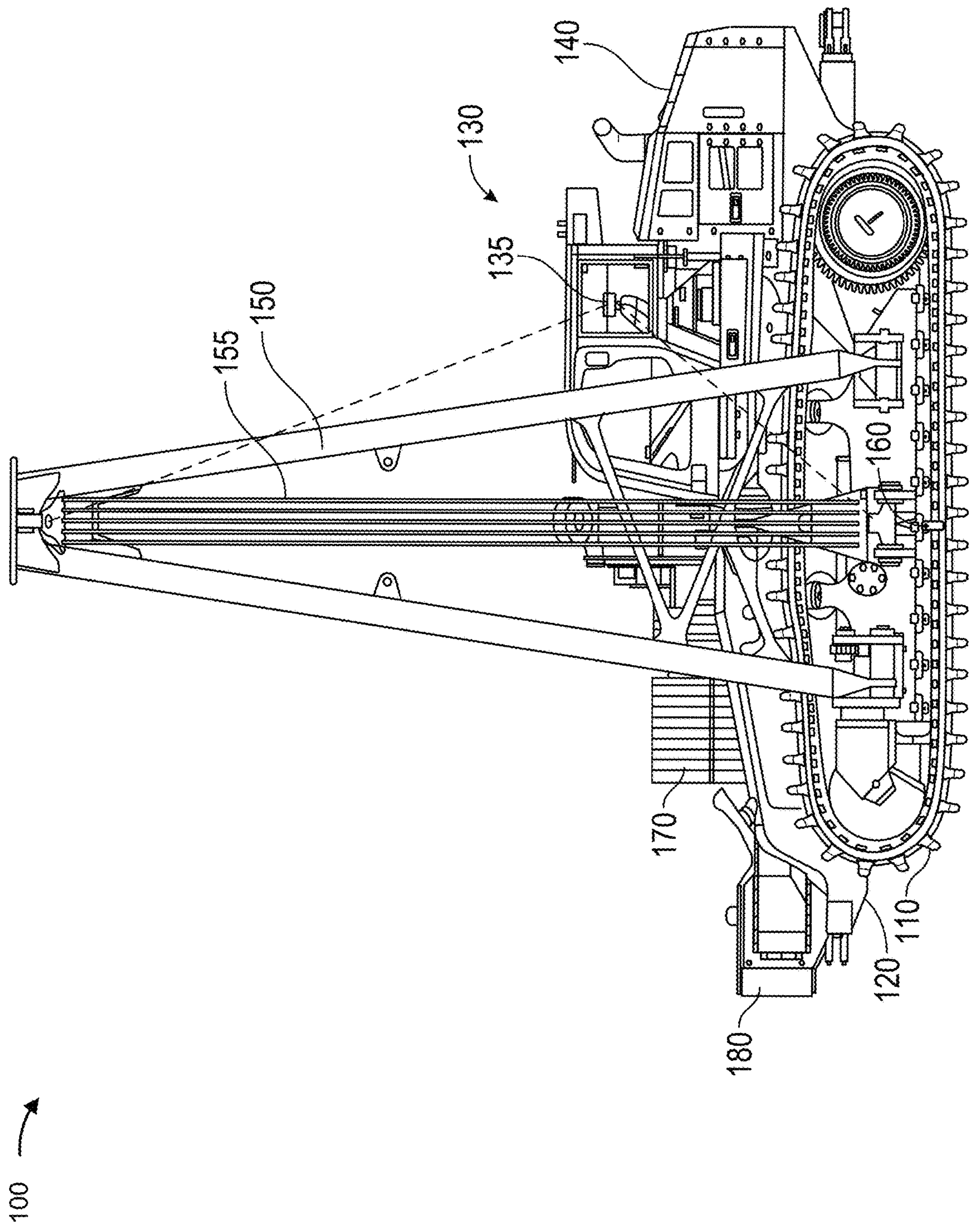
FIG. 1 is a diagram of a side view of an example machine described herein.

FIG. 1 is a diagram of a side view of an example machine 100 described herein. As shown in FIG. 1, machine 100 is a pipelayer machine. While FIG. 1 illustrates a pipelayer machine, the present disclosure is applicable to other types of machines with lifting assemblies.

As shown in FIG. 1, machine 100 includes ground engaging members 110, a machine chassis 120, an operator cabin 130, a power source 140, a boom 150, a hook component 160, a counterweight assembly 170, and a towing winch assembly 180. As shown in FIG. 1, ground engaging members 110 include tracks that are composed of a series of interlinked track shoes in an oval track and/or high drive configuration. Alternatively, ground engaging members 110 may include wheels, or rollers, among other examples.

As shown in FIG. 1, machine chassis 120 may be provided between ground engaging members 110 ("between" referring to the widthwise direction of machine 100 relative to forward and backward travel). In some implementations, machine 100 may be configured such that a location of a center of gravity of machine 100 is lower than a location of a center of gravity of existing pipelayer machines. Machine chassis 120 may be configured to support operator cabin 130 and power source 140. Operator cabin 130 may include an integrated display (not shown) and operator controls (not shown). As an example, the operator controls may be integrated joysticks.

Operator cabin 130 may further include seat assembly 135. Seat assembly 135 may be configured to face a front portion of machine 100. Operator cabin 130 may be configured to be stationary with respect to machine chassis 120 and ground engaging members 110. As shown in FIG. 1, operator cabin 130 may be provided between power source 140 and towing winch assembly 180.

Power source 140 may include an engine. As an example, power source 140 may include an internal combustion engine. As shown in FIG. 1, power source 140 may be provided in a rear portion of machine 100. For example, power source 140 may be provided adjacent to a rear surface (not shown) of operator cabin 130. By providing power source 140 in the rear portion of machine 100, a field of view (of the operator of machine 100) to side areas and front areas of machine 100 may be increased. Alternatively, power source 140 may be provided in a front portion of machine 100.

The increased field of view to the side areas and the front areas may decrease a frequency of stopping machine 100 to ensure that no obstructions (e.g., objects, individuals, among other examples) are provided in a path of machine 100 during an operation of machine 100. Accordingly, the increased field of view to the side areas and the front areas may increase a measure of efficiency of operating machine 100.

Boom 150 may be supported by machine chassis 120. Boom 150 may be configured to extend to a particular height at a particular angle from machine 100 (e.g., during a lifting operation performed by machine 100). As shown in FIG. 1, boom 150 may be provided adjacent to a lateral surface of operator cabin 130 and forward with respect to seat assembly 135.

By providing boom 150 forward with respect to seat assembly 135, a field of view (of the operator of machine 100) to areas surrounding machine 100 may be increased. For example, a field of view to hook component 160 and other components associated with boom 150 may be increased. The increased field of view to the areas surrounding machine 100 (including hook component 160 and the other components associated with boom 150) may increase a measure of efficiency of operating machine 100, as explained above. For example, a measure of efficiency of performing a task using hook component 160 may be increased.

Additionally, boom 150 may include a support structure that is configured to provide structural integrity to boom 150. Support members, of the support structure, may be configured in a manner to form a viewing opening that provides an increased field of view to the areas in comparison to a field of view to similar areas of existing pipelayer machines. As shown in FIG. 1, for example, a vertical height of the support structure may be configured to overlap with a vertical height of operator cabin 130. The support structure and the configuration of the support members are discussed in more detail below in conjunction with FIG. 2.

One or more lifting cables 155 may extend from a body of machine 100 to hook component 160 via boom 150 to assist in lifting and/or placing a load. Hook component 160 may include a cradle and/or other mechanism for securing, carrying, holding, lifting, and/or placing a pipeline segment. Hook component 160 may be configured to secure or move the load.

Counterweight assembly 170 may be supported by machine chassis 120. Counterweight assembly 170 may be configured to counterbalance forces created as boom 150 is extended during a lifting operation performed by machine 100. For example, counterweight assembly 170 may be configured to extend away from machine chassis 120 during the lifting operation. Counterweight assembly 170 may be provided adjacent to a different lateral surface of operator cabin 130 and forward with respect to seat assembly 135, as explained below.

Towing winch assembly 180 may be coupled to machine chassis 120. Towing winch assembly 180 may be configured to perform lifting and towing operations. Towing winch assembly 180 may include a drum and a cable wound about the drum. As shown in FIG. 1, towing winch assembly 180 may be provided in the front portion of machine 100.

By providing towing winch assembly 180 in the front portion of machine 100 and providing power source 140 in the rear portion of machine 100, a field of view (of the operator of machine 100) to towing winch assembly 180 may be increased. Alternatively, towing winch assembly 180 may be provided in the front portion of machine 100.

As indicated above, FIG. 1 is provided as an example. Other examples may differ from what is described in connection with FIG. 1. The number and arrangement of components shown in FIG. 1 are provided as an example. In practice, there may be additional components, fewer components, different components, or differently arranged components than those shown in FIG. 1.

Figure 2:
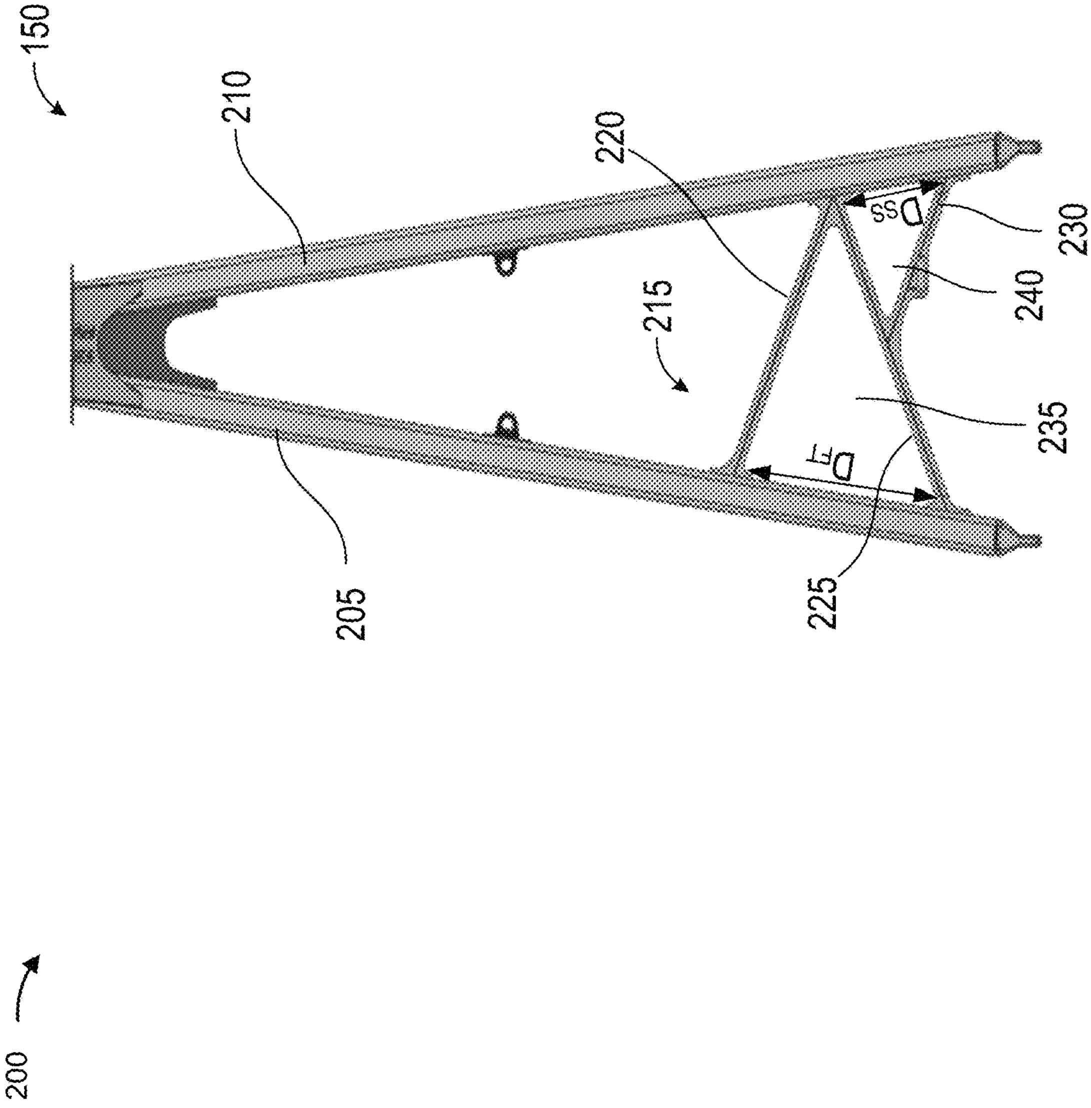
FIG. 2 is a diagram of a view of an example boom described herein.

FIG. 2 is a diagram of a view of an example boom 150 described herein. Boom 150 may comprise a metal. The metal may include steel, or aluminum, among other examples. As shown in FIG. 2, boom 150 may include a first member 205, a second member 210 that is provided opposite first member 205, and a support structure 215. Boom 150 may comprise a top portion and a bottom portion. For example, boom 150 may comprise a top half and a bottom half. Support structure 215 may be configured to provide structural integrity to boom 150. As shown in FIG. 2, support structure 215 may be connected to first member 205 and second member 210. Support structure 215 may be provided at the bottom portion of boom 150. For example, support structure 215 may be provided at the bottom half of boom 150.

Support structure 215 may include a first support member 220, a second support member 225, and a third support member 230. As shown in FIG. 2, a first end of first support member 220 may be connected to first member 205 and a second end of first support member 220 may be connected to second member 210. The first end is opposite the second end. As further shown in FIG. 2, a third end of second support member 225 may be connected to first member 205 and a fourth end of second support member 225 may be connected to the second end of the first support member 220. The third end is opposite the fourth end. In some implementations, the second end and the fourth end may be a same end. In other words, first support member 220 and second support member 225 may share a same end.

As shown in FIG. 2, a fifth end of third support member 230 may be connected to second support member 225. For example, the fifth end may be connected between the third end of second support member 225 and the fourth end of second support member 225. As shown in FIG. 2, a sixth end of third support member 230 may be connected to a portion, of second member 210, that is different than the portion of second member 210 to which the second end of the first support member 220 and the fourth end of second support member 225 are connected. For example, the sixth end may be connected to a portion of second member 210 that is below the portion of second member 210 to which the second end and the fourth end are connected.

As shown in FIG. 2, first support member 220, second support member 225, and first member 205 may form a first opening 235 configured to provide field of view, from operator cabin 130, to the areas surrounding machine 100. First opening 235 may be a primary opening of support structure 215. As further shown in FIG. 2, second member 210, second support member 225, and third support member 230 may form a second opening 240. Second opening 240 may be a secondary opening of support structure 215. A first area of first opening 235 may exceed a second area of second opening 240. In some implementations, the first area may be proportional to the second area. For example, the first area may be approximately four times the second area.

Similarly, the first area may exceed an area of a corresponding primary opening for existing pipelayer machines. In some implementations, the first area may be proportional to the area of the corresponding primary opening for existing pipelayer machines. For example, the first area may be approximately four times the area of the corresponding primary opening.

In this regard, a location of first support member 220, on boom 150, may increase the field of view of the operator to the areas surrounding machine 100 in comparison to a field of view to similar areas of existing pipelayer machines. By increasing the field of view of the operator to the areas surrounding machine 100, a measure of efficiency of operating machine 100 (e.g., operating boom 150, operating hook component 160, and/or operating other components associated with boom 150) may be increased.

As shown in FIG. 2, a distance $D_{FT}$ along support member 205 between the first end and the third end may exceed a distance $D_{SS}$ along support member 210 between the second end and the sixth end. In some implementations, distance $D_{FT}$ may be proportional to distance $D_{SS}$. For example, distance $D_{FT}$ may be approximately one and half times distance $D_{SS}$, or distance $D_{FT}$ may be approximately two times distance $D_{SS}$, among other examples. In some implementations, a distance between the third end and the fifth end may be equal to a distance between the fifth end and the sixth end.

As indicated above, FIG. 2 is provided as an example. Other examples may differ from what is described in connection with FIG. 2. The number and arrangement of components shown in FIG. 2 are provided as an example. In practice, there may be additional components, fewer components, different components, or differently arranged components than those shown in FIG. 2.

Figure 3:
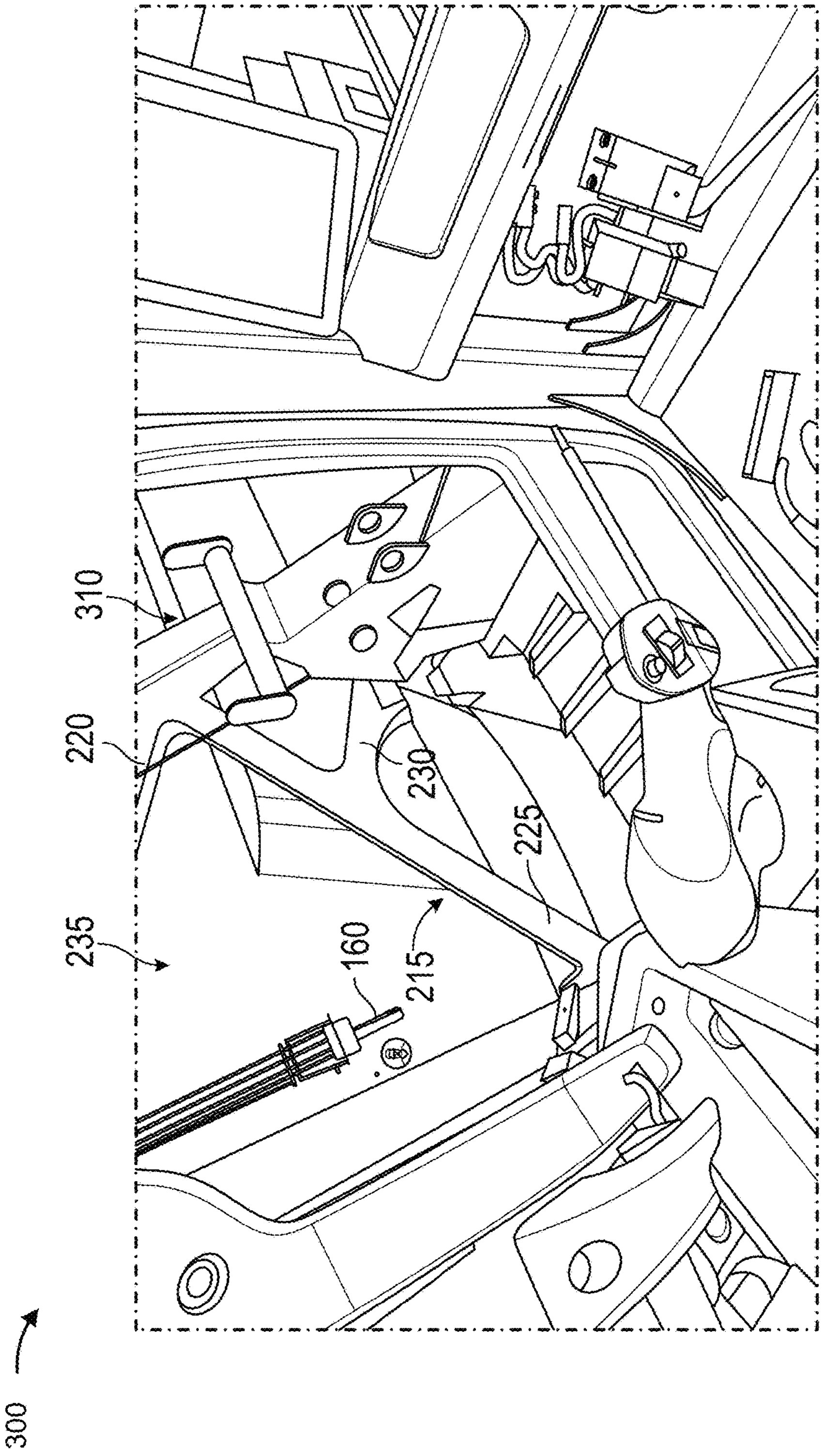
FIG. 3 is a diagram of an inside view of an example operator cabin described herein.

FIG. 3 is a diagram of an inside view of operator cabin 130 described herein. Some elements of machine 100 and operator cabin 130 have been described above in connection with FIGS. 1 and 2. As shown in FIG. 3, based on a location of first support member 220, first opening 235 may be configured to provide increased field of view to the areas surrounding machine 100 in comparison to a field of view of operators to similar areas surrounding existing pipelayer machines. For example, in light of the location of first support member 220, first opening 235 may be configured to provide increased field of view to hook component 160 and other components associated with hook component 160, such as fairlead tower 310.

Fairlead tower 310 may include one or more cables that are used during a lifting operation performed by machine 100. The one or more cables may include a portion of the one or more lifting cables 155 that connect hook component 160 to boom 150. As shown in FIG. 3, support structure 215 may be configured to be provided adjacent to operator cabin 130 of machine 100. For example, support structure 215 may be provided within a threshold distance of operator cabin 130 (e.g., provided within the threshold distance of a lateral surface of operator cabin 130). For example, support structure 215 may be provided within 30 degrees or less from a lateral surface of operator cabin 130.

As indicated above, FIG. 3 is provided as an example. Other examples may differ from what is described in connection with FIG. 3. The number and arrangement of components shown in FIG. 3 are provided as an example. In practice, there may be additional components, fewer components, different components, or differently arranged components than those shown in FIG. 3.

INDUSTRIAL APPLICABILITY

The present disclosure is directed to increasing a field of view of an operator to areas surrounding a pipelayer machine. The field of view may be increased by configuring locations of support members of a support structure of a boom of the pipelayer machine. As a result of configuring the locations of the support members, a size of a viewing opening formed by the support members may be increased.

Under the current design, a support structure, of a boom of an existing pipelayer machine, may include crossmembers that are configured in an "X" shape. The support structure may be provided at a bottom portion of the boom. Under such a configuration, the location of the support structure reduces a field of view of an operator to areas surrounding the pipelayer machine.

In the present disclosure, support members, of a support structure of a pipelayer machine, may be configured in a shape different than the "X" shape. By configuring the support structure to increase the size of the viewing opening as disclosed herein, a size of a viewing opening formed by the support member may exceed a size of a viewing opening formed by a same support member of existing pipelayer machines.

By increasing the size of the viewing opening, a field of view of the operator to the areas surrounding the pipelayer machine may be increased in comparison to a field of view of operators to similar areas surrounding existing pipelayer machines. Increasing the field of view of the operator may increase a measure of efficiency of operating the pipelayer machine during a lifting operation.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A boom of a pipelayer machine, the boom comprising:
- a first member;
- a second member converging toward the first member; and
- a support structure, connected to the first member and the second member, comprising:
  - a first support member;
  - a second support member; and
  - a third support member,
    - a first end of the first support member being connected to the first member and a second end of the first support member being connected to the second member,
    - a third end of the second support member being connected to the first member and a fourth end of the second support member being connected to the second end of the first support member, the fourth end being connected to the second member,
    - a fifth end of the third support member being connected to the second support member and a sixth end of the third support member being connected to a portion, of the second member, different than respective portions, of the second member, connected to the second end and the fourth end.

2. The boom of claim 1, wherein a distance between the first end and the third end exceeds a distance between the second end and the sixth end.

3. The boom of claim 1, wherein the first member, the first support member, and the second support member form a viewing opening configured to provide a field of view, from an operator cabin, to an area surrounding the pipelayer machine.

4. The boom of claim 3, wherein the viewing opening is a first opening,
- wherein the second member, the second support member, and the third support member form a second opening, and
- wherein a first area of the first opening exceeds a second area of the second opening.

5. The boom of claim 1, wherein the fifth end is connected between the third end and the fourth end.

6. The boom of claim 1, wherein the sixth end is connected, to the second member, below the second end and the fourth end.

7. The boom of claim 1, wherein the second member converges toward the first member at a top portion of the boom, and
- wherein the first end of the first support member is connected to the first member at a location that is closer to a bottom portion of the boom than to the top portion of the boom.

8. A pipelayer machine, comprising:
- a machine chassis;
- an operator cabin supported by the machine chassis; and
- a boom coupled to the machine chassis,
  - the boom comprising a first member, a second member converging toward the first member, and a support structure,
  - the support structure being provided adjacent to the operator cabin,
  - the support structure comprising a first support member, a second support member, and a third support member,
  - a first end of the first support member being connected to the first member and a second end of the first support member being connected to the second member,
  - a third end of the second support member being connected to the first member and a fourth end of the second support member being connected to the second end of the first support member, and
  - a fifth end of the third support member being connected to the second support member and a sixth end of the third support member being connected to a portion, of the second member, different than the second end and the fourth end.

9. The pipelayer machine of claim 8, wherein the fifth end is connected between the third end and the fourth end.

10. The pipelayer machine of claim 8, wherein the second member converges toward the first member at a top portion of the boom, and
- wherein the first end of the first support member is connected to the first member at a location that is closer to a bottom portion of the boom than to the top portion of the boom.

11. The pipelayer machine of claim 8, wherein a distance between the first end and the third end exceeds a distance between the second end and the sixth end.

12. The pipelayer machine of claim 8, wherein the first member, the first support member, and the second support member form a viewing opening configured to provide a field of view to a portion of an area surrounding the pipelayer machine.

13. The pipelayer machine of claim 12, wherein the viewing opening is a first opening, wherein the second member, the second support member, and the third support member form a second opening, and wherein a first area of the first opening exceeds a second area of the second opening.

14. The pipelayer machine of claim 8, wherein the support structure is configured to be provided adjacent to the operator cabin.

15. A boom of a machine, the boom comprising:

a first member;

a second member converging toward the first member; and a support structure comprising:

a first support member;

a second support member; and a third support member, wherein the first member, the first support member, and the second support member define a first opening, wherein the second member, the second support member, and the third support member define a second opening, and wherein a first area of the first opening exceeds a second area of the second opening.

16. The boom of claim 15, wherein the first support member and the third support member are parallel.

17. The boom of claim 15, wherein the first support member is connected to each of the first member and the second member, wherein the second support member is connected to each of the first member and the second member, and wherein the third support member is connected to each of the second support member and the second member.

18. The boom of claim 17, wherein the third support member connects at or near a mid-point of the second support member.

19. The boom of claim 15, wherein a distance between connections of the first support member and the second support member to the first member exceeds a distance between connections of the first support member and the third support member to the second member.

20. The boom of claim 15, wherein the second member converges toward the first member at a top portion of the boom, and wherein the first support member is connected to the first member at a location that is closer to a bottom portion of the boom than to the top portion of the boom.

* * * * *